June 16, 1936.  S. WRIGHT  2,044,656
TONGS
Filed Nov. 27, 1935
Fig.1.
Fig.2.
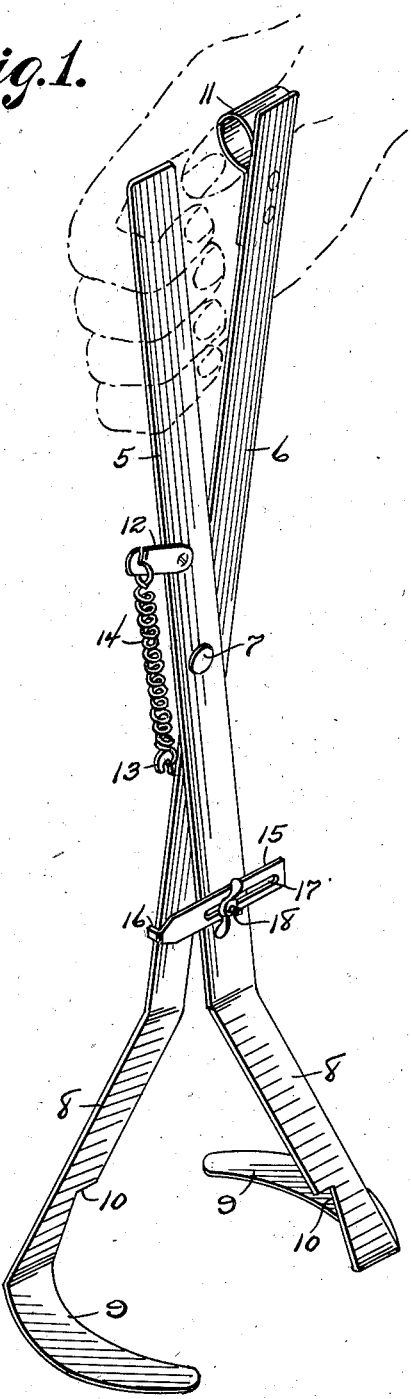
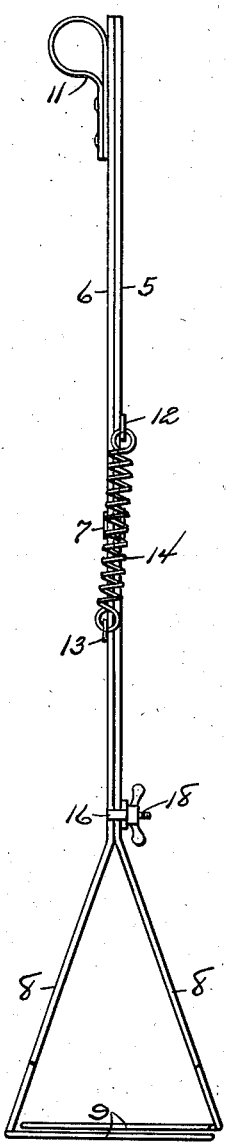
Sherman Wright
INVENTOR
BY Victor J. Evans & Co.
ATTORNEY Patented June 16, 1936

2,044,656

UNITED STATES PATENT OFFICE 2,044,656

TONGS

Sherman Wright, Forest, Ind., assignor of one-half to Jacob Shoemaker, Frankfort, Ind.

Application November 27, 1935, Serial No. 51,915

1 Claim. (Cl. 294—28)

The invention relates to tongs and more especially to fruit jar or jelly glass tongs.

The primary object of the invention is the provision of tongs of this character, wherein the fruit jar or jelly glass at its top can be conveniently gripped to permit the easy handling of the same with dispatch and without excessive labor on the part of the operative of the tongs.

Another object of the invention is the provision of tongs of this character, wherein a thumb loop is carried upon one of the lever members and associated with this lever member and the other lever member is a spring which normally holds the tongs in open position and the extent of opening thereof can be regulated to avoid too wide opening of such tongs so as to avoid rendering the same awkward in the operation thereof.

A further object of the invention is the provision of tongs of this character, wherein the cap or cover end of receptacles of varying sizes can be firmly gripped for the lifting of the receptacle.

A still further object of the invention is the provision of tongs of this character, which are simple in construction, thoroughly reliable and efficient in operation, readily and easily handled, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a perspective view of tongs constructed in accordance with the invention.

Figure 2 is an edge elevation thereof.

Similar reference characters indicate corresponding parts throughout the several views in the drawing.

Referring to the drawing in detail, the tongs comprise a pair of lever members 5 and 6, respectively, these being disposed in cross relation and are swingingly connected to each other by a pivot 7 at the crossing point of the same. The members 5 and 6 have the outwardly bent or outwardly divergent end portions 8 terminating in outwardly arched or curved jaws 9 which are disposed at right angles to the lever members 5 and 6 and accommodate therebetween a jar cap or a glass cover so that the same may be gripped on the bringing of the jaws in gripping contact therewith, these jaws being brought into this position on manually operating the lever members 5 and 6.

It is preferable to provide in the portions 8 cut-away areas 10 to effect the clearances for the cap or cover accordingly to the size thereof. These cut-away areas are in the edges of the portions 8 next to each other or, in other words, in the inner edges thereof.

At the handle or free end of the lever member 6 is riveted or otherwise made secure thereon a loop 11 for accommodating the thumb of the hand of an operative while the fingers of the hand embrace the other handle portion of the lever member 5 so that in this manner these members 5 and 6 can be actuated for the closing movements of the jaws 9.

Fixed to the lever member 5 at one side of the pivot 7 is a hook ear 12 while fixed to the other lever member 6 at the other side of the pivot 7 is a hook ear 13 and to these ears are connected the terminals of a coiled retractile spring 14 which functions to automatically open the tongs or spread the jaws 9 apart so that normally the tongs are in open position.

Adjustably carried by the member 5 is a stop 15 in the form of a slide plate having an abutment ear 16 in the path of the member 6 and this slide is formed with an elongated slot 17 receiving a winged nut carrying fastener 18 as carried by the member 5, the abutment ear 16 being in the path of opening movement of the lever member 6 and in this manner limits the opening action of the tongs. It is apparent that the opening action can be varied in extent by adjustment of the stop 15.

The tongs are automatically opened by the spring 14 and closed by the closing of the hand of the operative when gripping the handle ends of the lever members 5 and 6 as shown in Figure 1 of the drawing.

What is claimed is:

In tongs of the character described, a pair of straight levers pivoted to each other intermediate of their ends, lateral outwardly diverging portions formed with said levers and having reversely disposed laterally extending outwardly curved jaws to lie inwardly of said portions for gripping contact with a closure of a receptacle when located between said jaws, the portions next to the jaws being cut away to provide clearances located next to the inner edges of the jaws for accommodating the said closure, a spring connected to one lever at one side of the pivot and to the other lever at the other side of said pivot for urging the jaws apart, a set screw carried by one lever adjacent to one of the said portions, and a slotted slide plate fitting said set screw and having an abutment ear in the path of the other lever for contact therewith to limit the separation of the jaws under the action of the spring.

SHERMAN WRIGHT.